United States Patent [19]
Waldstrøm

[11] Patent Number: 6,092,388
[45] Date of Patent: Jul. 25, 2000

[54] METHOD AND AN APPARATUS FOR PRODUCTION OF FROZEN CONFECTIONERY, IN PARTICULAR EDIBLE ICE BODIES

[75] Inventor: Ejvind Waldstrøm, Risskov, Denmark

[73] Assignee: Tetra Pak Hoyer A/S, Højbjerg, Denmark

[21] Appl. No.: 09/147,442

[22] PCT Filed: Jun. 30, 1997

[86] PCT No.: PCT/DK97/00281

§ 371 Date: Dec. 28, 1998

§ 102(e) Date: Dec. 28, 1998

[87] PCT Pub. No.: WO98/00030

PCT Pub. Date: Jan. 8, 1998

[30] Foreign Application Priority Data

Jun. 28, 1996 [DK] Denmark ................................ 0708/96

[51] Int. Cl.⁷ ...................................................... A23G 9/08
[52] U.S. Cl. ................................................. 62/345; 62/380
[58] Field of Search ................................ 62/345, 63, 380; 425/126.1, 126.2; 426/515

[56] References Cited

U.S. PATENT DOCUMENTS

| | | | |
|---|---|---|---|
| 4,335,583 | 6/1982 | Billett | 62/345 |
| 4,546,615 | 10/1985 | Gram | 425/126.2 |
| 4,715,193 | 12/1987 | Curti | 62/345 |
| 5,343,710 | 9/1994 | Cathenaut et al. | 62/71 |

*Primary Examiner*—William E. Tapolcai
*Attorney, Agent, or Firm*—Nixon Peabody LLP; David S. Safran

[57] ABSTRACT

Conventionally, edible ice bodies are frozen in freezing moulds that are moved through a bath of cold salt brine, which ensures a good freezing effect, but also presents obvious problems. For avoiding these problems it has already been endeavoured to use cold air instead, but so far without noticeable practical success. The invention provides for an efficient and economical freezing by cold air, viz. Ir suggesting that the transverse carrier lamella plates (2) for rows of aluminium moulds (8) in an endless lamella conveyor are advanced stepwise into positions, in which cold air from underlying slot nozzles (46) is blown up into the spaces between the rows of moulds in a manner effectively shielded from the surroundings.

7 Claims, 3 Drawing Sheets

METHOD AND AN APPARATUS FOR PRODUCTION OF FROZEN CONFECTIONERY, IN PARTICULAR EDIBLE ICE BODIES

BACKGROUND OF THE INVENTION

1. Field of the Invention

The present invention relates to a method and an apparatus for production of edible ice bodies by moulding and freezing the bodies in singular moulds.

2. Description of Related Art

For such a production with high capacity it is customary that the moulds, in transversely arranged rows, are advanced in a conveying line which can be rectilinear or annular in a horizontal plane, the moulds during this conveying being depending into a freezing brine, which ensures a good heat transfer. The moulds are initially filled with a cold ice substance, and in a following station, in which the ice has started to solidify, carrier sticks are inserted in the products, whereafter a final freezing is effected along a freezing stretch. At the end thereof the rows of moulds are successively lifted and transferred to a bath of warm water for a brief heating of the mould walls in order to loosen the adherence of the ice bodies to the moulds, whereafter the upwardly protruding carrier sticks of the products are gripped by a gripping equipment operating to pull the products upwardly and transfer them to further conveying to a packing or working station, e.g. for applying a coating and, optionally, a withdrawal of the carrier sticks in cases where these should not remain on the products.

The use of the freezing brine, which is a strong salt solution, involves a number of problems, partly because it is indeed not a food grade substance and partly because it is heavily corrosive, whereby the moulds and other relevant parts of the apparatus should be made of corrosion resistive materials.

It has previously been recognized that these problems may be overcome by cooling the moulds with cold air instead of brine, but the production systems of this type as disclosed so far have been tremendously energy consuming, with a poor efficiency of the freezing air and even with a non-uniform freezing action on the moulds.

SUMMARY OF THE INVENTION

It is the purpose of the present invention to provide a method and an apparatus which enables an air freezing of the moulds with a high efficiency.

According to the invention the transverse rows of moulds, which are mounted depending from transverse carrier plates forming a carrier belt, are advanced stepwise into positions above intermediate areas between underlying, likewise transverse slit nozzles, through which freezing air is blown up against the underside of the carrier belt into the interspaces between the mould rows. It has been found possible to thereby achieve a very efficient air sweeping of the moulds, as the air, in an unobstructed and forceful manner, may be blown up to the carrier belt and be reflected therefrom so as to flow down along the walls of the moulds right from the upper ends thereof.

In an apparatus according to the invention, cf. claim 2, it is advantageous to use depending, flexible and slightly protruding skirt plates at the opposite edges of the carrier plates (claim 3). When these skirt plates meet each other at their lower ends, they will form a depending wedge formation between the neighbouring mould rows, whereby the upwardly directed air flow will be cleaved and guided up to a concentrated impact against the mould walls, whereby an effective heat transfer is obtainable. Moreover, the skirt plates will provide a sealing or shielding effect towards the surroundings, also if changes occur in the mutual distance between the carrier plates, in particular in connection with a sprocketing between a forward run and a return run of the belt formed by the carrier plates, such that no noticeable amount of cold air can escape from the space underneath the moulds.

With the use of an upper forward run and an underlying return run of the said carrier belt it is perfectly possible to expose even the moulds in the lower run to an effective freezing. In this run the moulds face downwardly, but when the ice substance in the upper run has reached such a degree of freezing that the ice bodies adhere to the moulds, then the same bodies will be fully self-holding in the moulds also when these are turned upside down. When thus also the return run can be used for the freezing of the bodies this may imply a minimizing of the total length of the conveyor, which is of course important for both the space requirements and the apparatus costs.

BRIEF DESCRIPTION OF THE DRAWINGS

In the following the invention is described in more detail with reference to the drawing, in which.

DETAILED DESCRIPTION OF THE INVENTION

Figure 1:
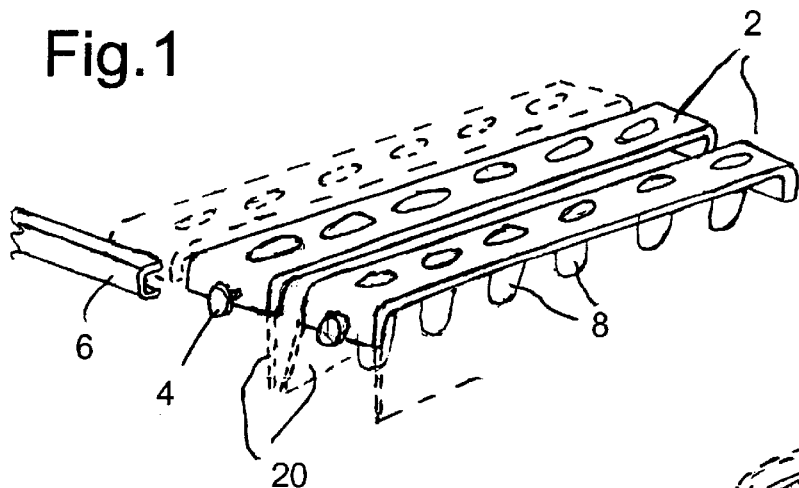
FIG. 1 is a perspective view of a number of mould carrying lamella plates in an apparatus according to the invention.
Figure 2:
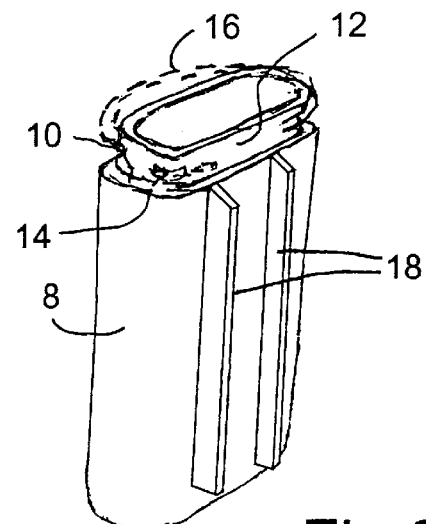
FIG. 2 is a corresponding view of a single mould therein.

FIG. 1 illustrates a few carrier plates in a row of such plates forming a conveyor belt driven by conveyor chains, the plates 2 being advanced with rollers 4 in engagement with guiding rails 6. Each plate has a row of holes in which there are mounted depending moulds 8 made of aluminium. At their upper ends the moulds are provided with a shoulder portion 10 and with a neck portion 12 projecting upwardly therefrom so as to fit in the plate hole and having a ring groove 14 at the corners for receiving a locking ring 16. Hereby the moulds can be fixed to the plates in a sufficiently rigid and tight manner. The moulds may be provided with cooling ribs 18.

The carrier plates 2 are provided with depending skirt plates 20 seeking to pivot resiliently outwardly, whereby they are pressed together at their lower ends so as to seal the slot between the carrier plates.

Figure 3:
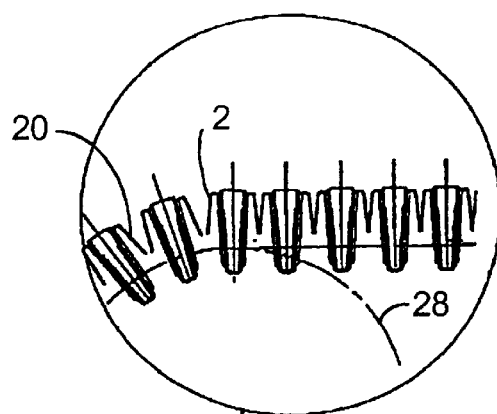
FIG. 3 is a lateral view of the entire apparatus.
Figure 3:
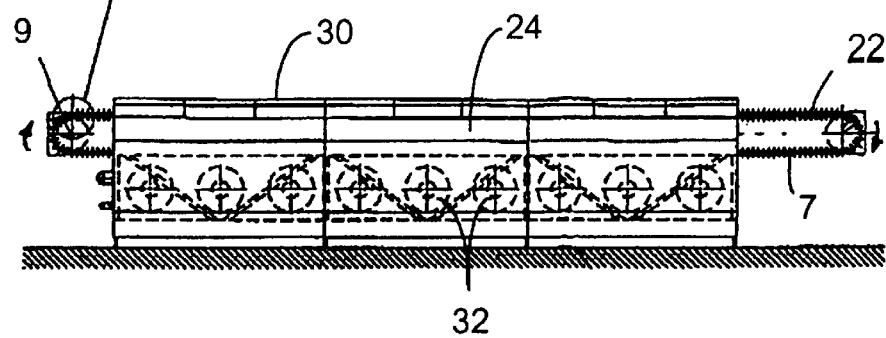

The entire conveyor is shown in FIG. 3, where the said conveyor belt is designated 22. This belt, with both its upper run and its lower return run, is passed through an air cooling zone 24 with interior cooling and circulation of freezing air. The projecting end portions of the conveyor are sealed with non-illustrated side panels, and from the inserted partial view it will be seen that the skirt plates 20 maintain their sealing action during the passage of the belt around the relevant sprocket wheels 28. The top of the freezing tunnel 24 is closed with a lid 30 which, however, may have an opening at a stick insertion station somewhat inside the end of the tunnel at which the moulds are filled, this not being further illustrated.

Figure 4:
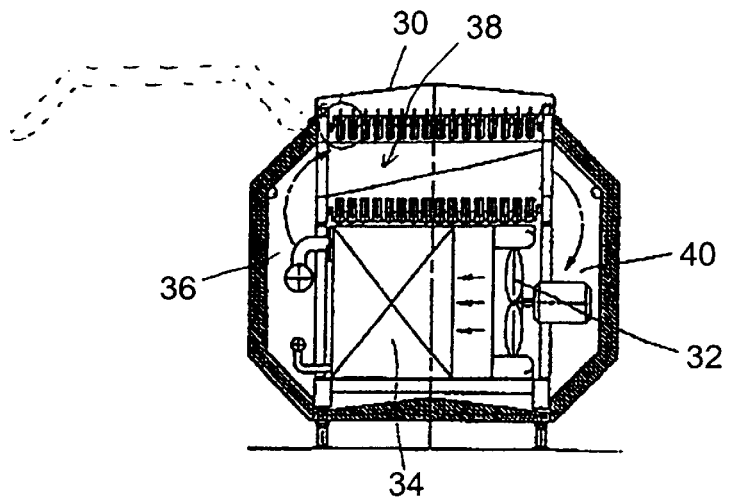
FIG. 4 is an end view thereof.

In FIGS. 3 and 4 it is indicated that the air system comprises a row of laterally oriented fans 32 forcing air through lower cooler elements 34, from which the cold air flows through a side compartment 36 up to a distributor chamber 38 between the upper and the lower run of the conveyor 22. This chamber is described in more detail below. The air is sucked off from the chamber to the fan 32 through an opposite side compartment 40.

The walls of the tunnel are well heat insulated, and they are made as sections that can be individually removed, e.g. in being swung upwardly as shown in dotted lines.

Figure 5:
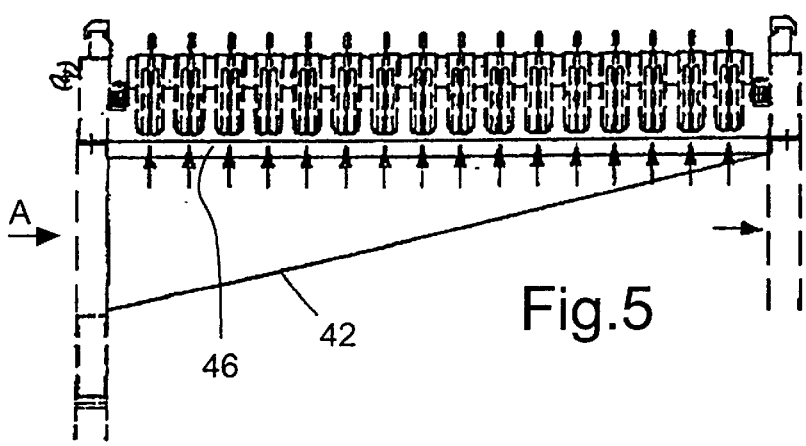
FIGS. 5–7 are interconnected plan views of an air distribution system in the apparatus.
Figure 7:
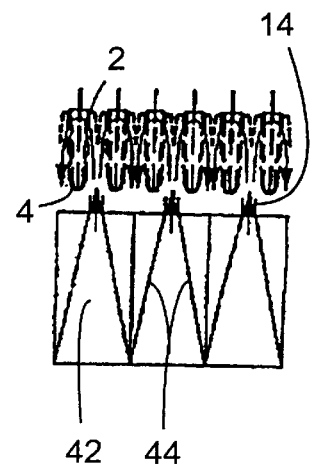
Figure 6:
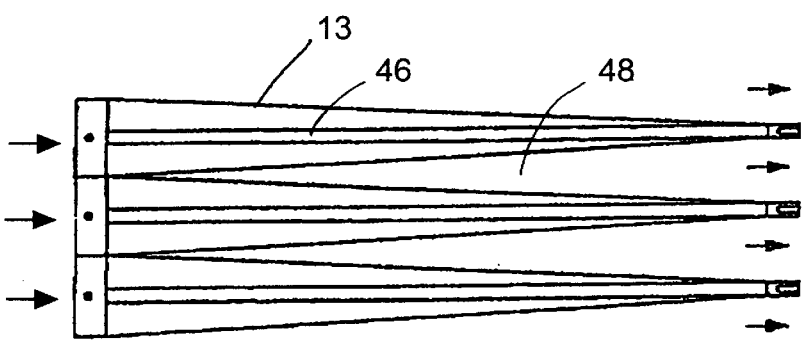

In the chamber 38, as shown in FIGS. 5–7, there is arranged a system of guide plates with bottom portions 42 which, from an inlet opening A in the left hand side, extends upwardly inclined and also in a narrowing manner towards the opposite side. The side edges of these bottom plates 42 have upstanding wall portions 44 which, in an inclined and narrowing manner, extend upwardly so as to form a narrow slit 46 all over the width of the belt 22 and immediately beneath the the moulds 8. Between the single units 42,44,46 there is a free space 48 which is in open connection with the outlet to the suction chamber 40.

Figure 8:
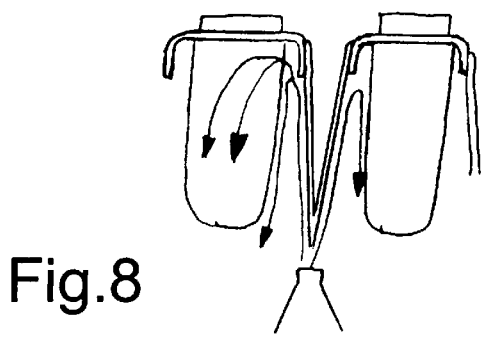
FIG. 8 is a side view illustrating the action of the freezing air against the moulds.

In operation, the belt 22 is advanced stepwise into positions as shown in FIGS. 7 and 8, i.e. with the carrier plates 2 in positions, in which the meeting ends of the skirt plates 20 of every second set of neighbouring plates are located just above the slits 46. With the disclosed design of the system the cold and strong air flow from the split 46—as illustrated in FIG. 8—will be cleaved by the skirt plates 20 and with noticeable turbulence be forced upwardly along these plates to their upper ends, from which the air is effectively distributed about the moulds. Thereafter the air may more calmly flow further to the space 48 and still further through a wide channel path to the fan.

Figure 11:
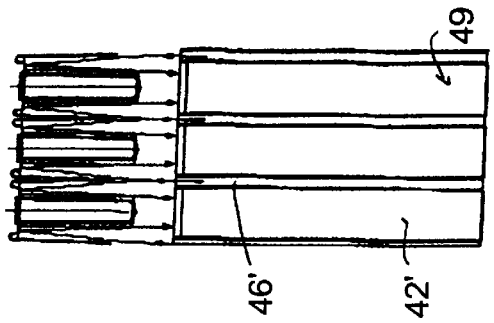
FIGS. 9–11 are plan views corresponding to FIGS. 5–7 of a modified system.
Figure 9:
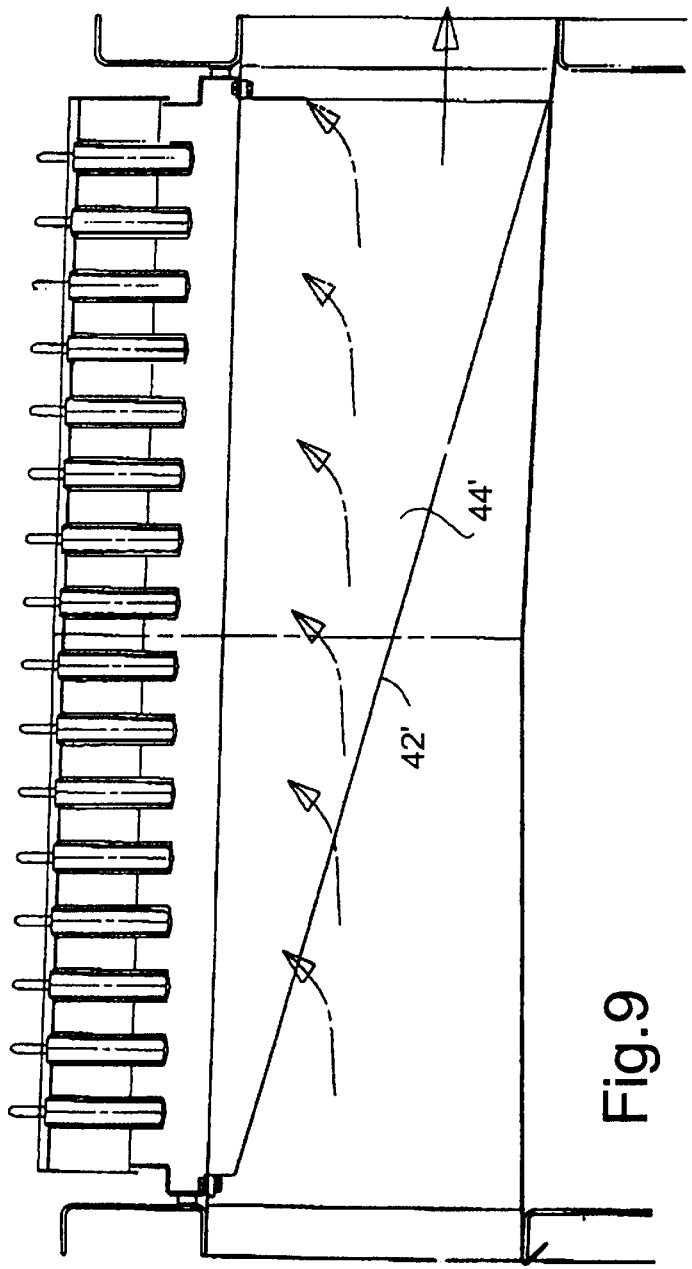
Figure 10:
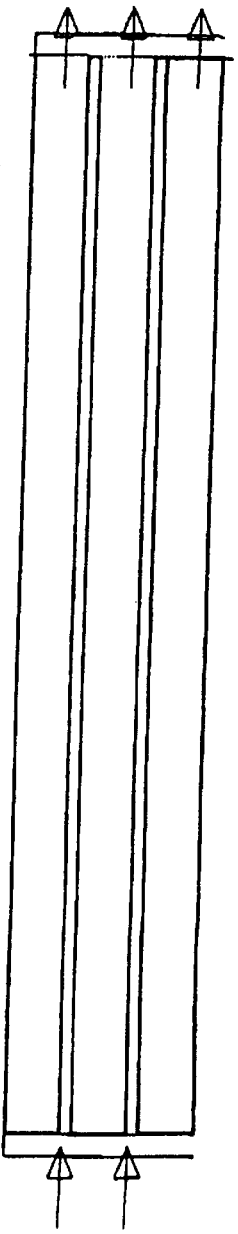

In FIGS. 9–11 another and preferred design of the distributor system according to FIGS. 5–7 is illustrated. Here, the bottom portions 42' are oppositely inclined, and the wall portions 44' are arranged as triangular, vertical side walls located such that in an alternating manner they form narrow, upwardly open slit chambers 46' and broader intermediate spaces 49, which at the bottom are closed by the bottom plates 42' and, besides, are open towards the discharge side. The inlet air flows up through the slit chambers 46', also here directly up against the meeting edges of the skirt plates 20, whereafter the air can flow off to the outlet side with reduced velocity through the broader intermediate space 49. In particular this design of the system has been found to be very advantageous in practice.

In this way it has been found possible to achieve such an efficient utilisation of the freezing air that the system may operate with good economy and capacity.

It will be possible to let the products remain in the moulds while these are moved along a stretch of the lower run, where they will still be exposed to the cold air. The products will be self-holding in the inverted moulds, and by such an exploitation of the return run it will be possible to reduce the overall length of the apparatus. If the thawing release and demoulding of the products is arranged at the end of the return run, the moulds will be easy to keep clean for possible knocked off product fragments, as these will then fall out by themselves.

According to the invention the required release thawing may well take place inside the cold space, viz. in that a 'heat box' is brought to move up or down for communication with the moulds of the single carrier plates. Use can be made of any suitable heating source which may more or less rapidly operate to effect a release of the products by heating through the walls of the aluminium moulds.

I claim:

1. An apparatus for producing edible ice bodies by molding and freezing comprising a carrier belt made of juxtaposed lamellar carrier plates, each of the carrier plates carrying a row of depending molding and freezing molds for advancing said molds through a freezing zone in which they are exposed to blown-on freezing air, means for effecting blowing on of the freezing air having crosswise oriented nozzle slits, driving means for stepwise advancing the carrier belt to positions in which the molds are located in interspaces between the nozzle slits; wherein the nozzle slits are formed by means of an air box system which, at one side of the carrier belt, receives freezing air from a transversely oriented blower/air cooler system for channeling the freezing air to the respective air slits, while the same air box system, in the areas between the nozzle slits, have partial sections for receiving return freezing air from the outsides of the freezing molds and for guiding this air to an air intake area for the blower/air cooler system located at the opposite side of the carrier belt.

2. An apparatus according to claim 1, characterized in that the air box system is mounted in the interspace between an upper forward run and a lower return run of the carrier belt in such a manner that the freezing air is additionally brought into contact with the molds of the lower return run of the belt.

3. An apparatus according to claim 1, characterized in that the air box system has intake openings directly to narrow, mutually separated box compartments having upper openings forming the said nozzle slits, while between these compartments there are return box compartments which, at their top sides, receive the freezing air returned :from the molds and guide this air to the outlet opening, i.e. to the said air intake opening of the blower/air cooler system, said return air compartments having bottom plates which, from a high level position at the said inlet openings, are downwardly inclined towards the lower edge of the respective outlet openings.

4. An apparatus according to claim 1, characterized in that the molds are made of aluminium with outstanding rib portions.

5. An apparatus according to claim 4, characterized in that the molds are made with an exteriorily narrowed neck portion that fits into a receiving hole in the carrier plate and is provided with circumferential groove portions for reception of a locking ring above the carrier plate.

6. An apparatus according to claim 1, characterized in that the carrier belt extends as a conveyor belt with an upper forward run, in which the molds cooperate with the said nozzle slits or rows, and an underlying return run, in which the molds are moved with their mouthings facing downwardly and so as to be upwardly projecting into an air space in open connection with the freezing air space, from which the molds in the upper run are subjected to the freezing air.

7. An apparatus according to claim 6, characterized in that the associated means for cooling and blowing of the freezing air are provided underneath the lower conveyor run for provision of a crosswise directed air flow, which is circulated across the carrier conveyor in an opposite transverse direction, respective upwardly and downwardly air guiding connector channels being arranged at the opposite sides behind respective openable side wall portions.

\* \* \* \* \*